United States Patent [19]
Maus et al.

[11] Patent Number: 5,201,247
[45] Date of Patent: Apr. 13, 1993

[54] ASSEMBLED SHAFT AND PROCESS FOR PRODUCTION THEREOF

[75] Inventors: Wolfgang Maus; Helmut Swars, both of Bergisch Gladbach, Fed. Rep. of Germany

[73] Assignee: Mannesmann Aktiengesellschaft, Dusseldorf, Fed. Rep. of Germany

[21] Appl. No.: 600,151

[22] Filed: Oct. 19, 1990

Related U.S. Application Data

[63] Continuation-in-part of Ser. No. 293,746, Jan. 3, 1989, abandoned.

[30] Foreign Application Priority Data

Jan. 14, 1988 [DE] Fed. Rep. of Germany ....... 3800912

[51] Int. Cl.$^5$ ..................... F16H 53/00; F01M 1/06
[52] U.S. Cl. ........................... 74/567; 29/523; 123/90.34; 123/90.6
[58] Field of Search .............. 74/567, 568; 123/90.33, 123/90.34, 90.60, 90.17; 29/523, 430, 421.1, 90.6; 78/58

[56] References Cited

U.S. PATENT DOCUMENTS

| | | | |
|---|---|---|---|
| 4,293,995 | 10/1981 | Jordan | 29/523 X |
| 4,575,913 | 3/1986 | Sugiuchi et al. | 74/567 X |
| 4,644,912 | 2/1987 | Umeha et al. | 123/90.6 X |
| 4,750,250 | 6/1988 | Maus et al. | 29/523 X |
| 4,809,562 | 3/1989 | Bendoraitas et al. | 29/523 X |
| 4,938,448 | 3/1991 | Ellis | 74/573 R |

FOREIGN PATENT DOCUMENTS

| | | | |
|---|---|---|---|
| 0119112 | 9/1984 | European Pat. Off. | 74/567 |
| 0213529 | 3/1987 | European Pat. Off. | 29/523 |
| 3128522 | 2/1983 | Fed. Rep. of Germany | 123/90.6 |
| 3545554 | 7/1987 | Fed. Rep. of Germany | 74/567 |
| 3633435 | 4/1988 | Fed. Rep. of Germany | 29/523 |
| 57-149655 | 9/1982 | Japan | 74/567 |
| 63-11550 | 3/1988 | Japan | 74/567 |
| 1008884 | 11/1965 | United Kingdom | 74/567 |
| 1117816 | 6/1968 | United Kingdom | 74/567 |
| 2133104 | 7/1984 | United Kingdom | 74/567 |

OTHER PUBLICATIONS

Tables 1–59, 1–82, 1–88, 1–57 on pp. 117, 118, 149, 155, 108 and 109 of Handbook of Applied Engineering Science, 2nd Edition CRC Press, 1976.

*Primary Examiner*—Vinh T. Luong
*Attorney, Agent, or Firm*—Anderson Kill Olick & Oshinsky

[57] ABSTRACT

An assembled shaft, including a hollow shaft, elements with through-bores attached to the shaft by expansion of the shaft in individual associated longitudinal portions, and supporting sleeves provided inside individual of the elements so as to rest against the hollow shaft and be plastically expanded in situ, by the expansion of the shaft, at least the individual elements of both the elements and the hollow shaft having an elastic pretension in the through-bore thereof.

1 Claim, 3 Drawing Sheets

5,201,247

ASSEMBLED SHAFT AND PROCESS FOR PRODUCTION THEREOF

This is a continuation-in-part application of Ser. No. 07/293,746, filed Jan. 3, 1989, now abandoned.

BACKGROUND OF THE INVENTION

The invention relates to an assembled shaft consisting of a hollow shaft and elements with through-bores such as bearing bushes, cams or gear wheels attached to it by expanding it in individual associated longitudinal portions and to a process for producing an assembled shaft by fixing elements such as bearing bushes, cams or gear wheels on a hollow shaft by expanding the latter in individual associated longitudinal portions.

EP-A-0 213 529 describes a process for attaching drive elements such as cams, gears or bearing bushes on a hollow shaft which consists of a commercial tube, with the drive elements being slid onto it and attached to it by expanding the tube portions positioned inside them. The material of the tube itself being deformed plastically whereas that of the drive elements is deformed only elastically so that due to the spring-back of the latter a firm fit on the shaft is achieved. Furthermore, the unpublished German Patent Applications P 36 33 435.9 and P 3717516, specify dimensioning rules according to which, as a function of the material properties of the tube and drive elements, and especially of their modulus of elasticity and yield point, the geometric conditions, e.g. the inner and outer tube diameter have to be determined in order to achieve a non-rotating, force-locking connection between the shafts. It has been found that if the invention, in particular, is applied to camshafts of motor vehicle engines, the component dimensions required by these dimensioning rules, for design and weight reasons, cannot always be made available.

SUMMARY OF THE INVENTION

Accordingly, it is an object of the present invention to provide a shaft of the above type in which a sufficiently safe attachment of the drive elements on the hollow shaft is achieved even in those cases where the possible dimensions of the shaft and drive elements do not permit the above-mentioned dimensioning rules to be observed.

Pursuant to this objective, and others which will become apparent hereafter, one aspect of the present invention resides in that inside at least individual elements, supporting sleeves resting against the hollow shaft and plastically expanded in situ have been provided and that at least the individual elements are under elastic pretension in their through-bores. In contrast to the process described above, it is then no longer necessarily the material of the hollow shaft itself which is plastically deformed, but primarily the material of the supporting sleeve. As a result, the thickness of the material undergoing plastic expansion may be increased to the required dimension if the material of the hollow shaft is not sufficient for generating the required pretension in the drive element. It is then also possible to select for the hollow shaft a material which does not necessarily have the properties otherwise required for plastic expansion, but which has other advantages such as offering the possibility of saving weight, e.g. aluminum.

In an advantageous embodiment of the invention, it is possible to select for the supporting sleeve a material which has a higher modulus of elasticity or a higher yield point than that of the hollow shaft. As the former then already undergoes plastic deformation at a lower rate of expansion, the amount of its elastic spring-back after completion of the expansion process is also reduced, an amount which has to be deducted from the elastic deformation of the outer parts during the expansion process and in consequence reduces the force effecting the force-locking connection between the parts.

In a preferred embodiment, the supporting sleeves have a greater axial length than the drive elements, i.e. the portions taken up by the supporting sleeves on the inside of the hollow shaft axially extend beyond those taken up by the drive elements on the outside of same. In this way, bulging of the tube accompanied by notch effects on the end faces of the elements is prevented. If the drive elements are arranged with only a small distance between them, it is possible to provide a joint supporting sleeve since the portions of the supporting sleeves projecting beyond the elements would contact each other in any case.

In a further special embodiment of the invention, the inner ends of the supporting sleeves are shaped so as to be conical, thereby achieving a gradual transition from the expanded to the unexpanded portions of the shaft and, in particular, preventing a notch effect on abrupt transitions between these regions.

DETAILED DESCRIPTION OF THE PREFERRED EMBODIMENT

Figure 1:
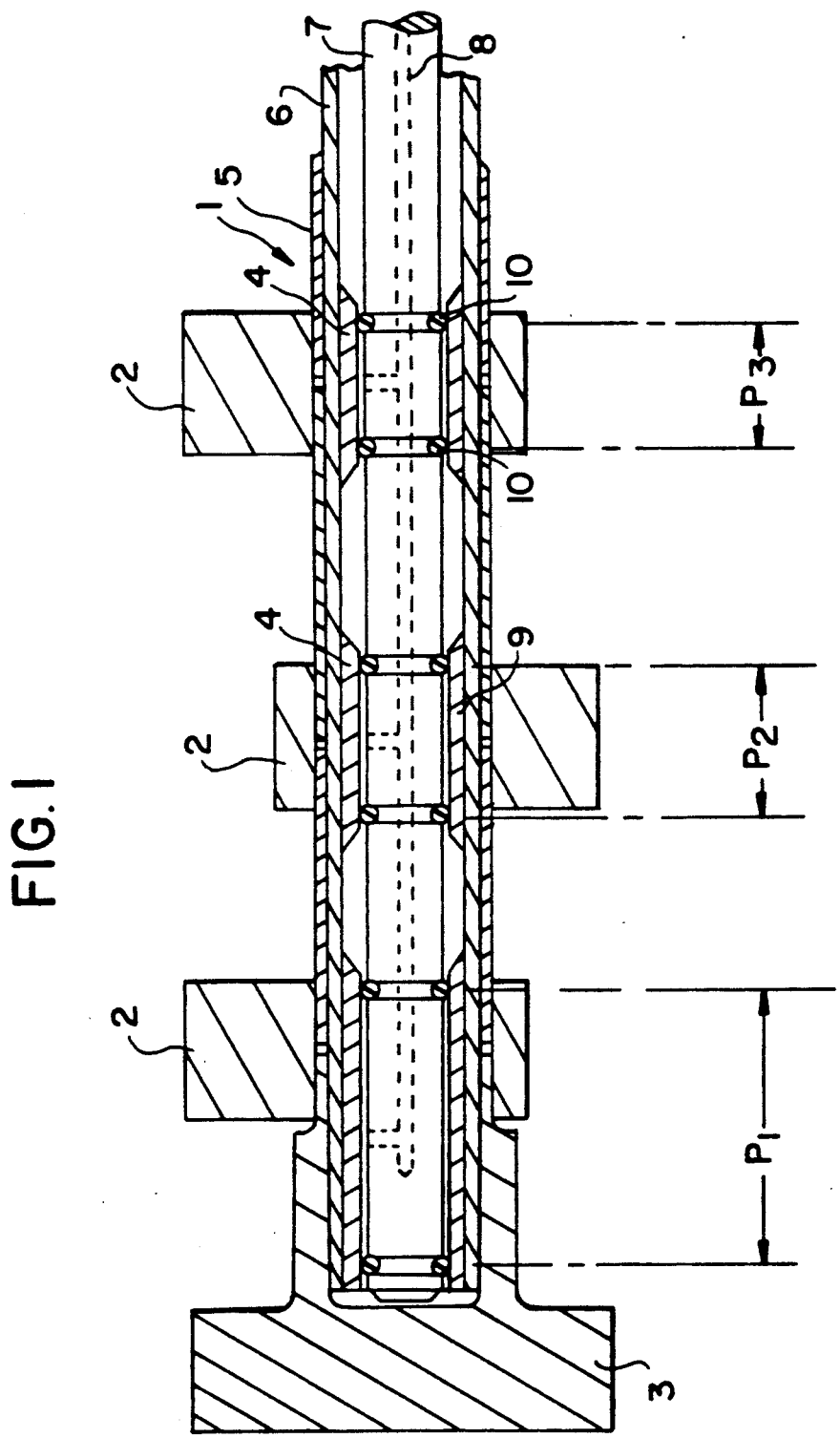
FIG. 1 shows an axial longitudinal section through part of a camshaft pursuant to the present invention.

As seen in FIG. 1, cams 2 and an end flange 3 are attached to a hollow shaft 1 by supporting sleeves 4, plastically expanded in situ which on the inside, with the presence of a certain projection, cover those regions of the hollow shaft 1, which on the outside are taken up by the drive elements (in this case cams 2 and end flange 3). The respective regions of the hollow shaft 1, as well as the cams 2 and the end flange 3 are expanded and deformed in the elastic range only so that they spring back after completion of the expansion process thereby producing a firm, force-locking connection between the parts. The material properties of the hollow shaft 1 may then be different from those cases where direct and plastic expansion takes place. For example, for weight saving purposes, the hollow shaft 1 may consist of an outer layer 5 made of high-tensile steel and an inner layer 6 produced from aluminum. Despite the outer layer 5 being harder than the inner layer 6 in such a construction, both layers 5 and 6 expand and deform, although to different extents. The strength and surface of the outer layer 5 may then be such that without any further machining it may be inserted into friction or roller bearings (not illustrated). Fixing the cams 2 and the end flange 3 is preferably effected in one operation by means of a hydraulic pressure probe 7, which is inserted into the hollow shaft and in whose interior, via a channel 8 provided with branches, a pressure fluid may be supplied to regions 9 to be expanded which are axially limited by annular seals 10. The ends of the supporting sleeves 4 are shaped so as to be inwardly conical, so that in the course of expansion a gradual transition between the elastically expanded and the unexpanded part of the hollow shaft 1 is achieved. The process has certain advantages if, like in this case, for superior reasons, because the camshaft is to be used in the engine of a motor vehicle, the outer diameter of the end flange 3 is so limited that the remaining thickness of the component is not sufficient for allowing a sufficient amount of spring-back required for achieving the necessary pressure force relative to the hollow shaft 1. Furthermore, the introduction of torque via the end flange 3 of the camshaft into the hollow shaft is improved and the risk of slip between these two parts is reduced.

Figure 2:
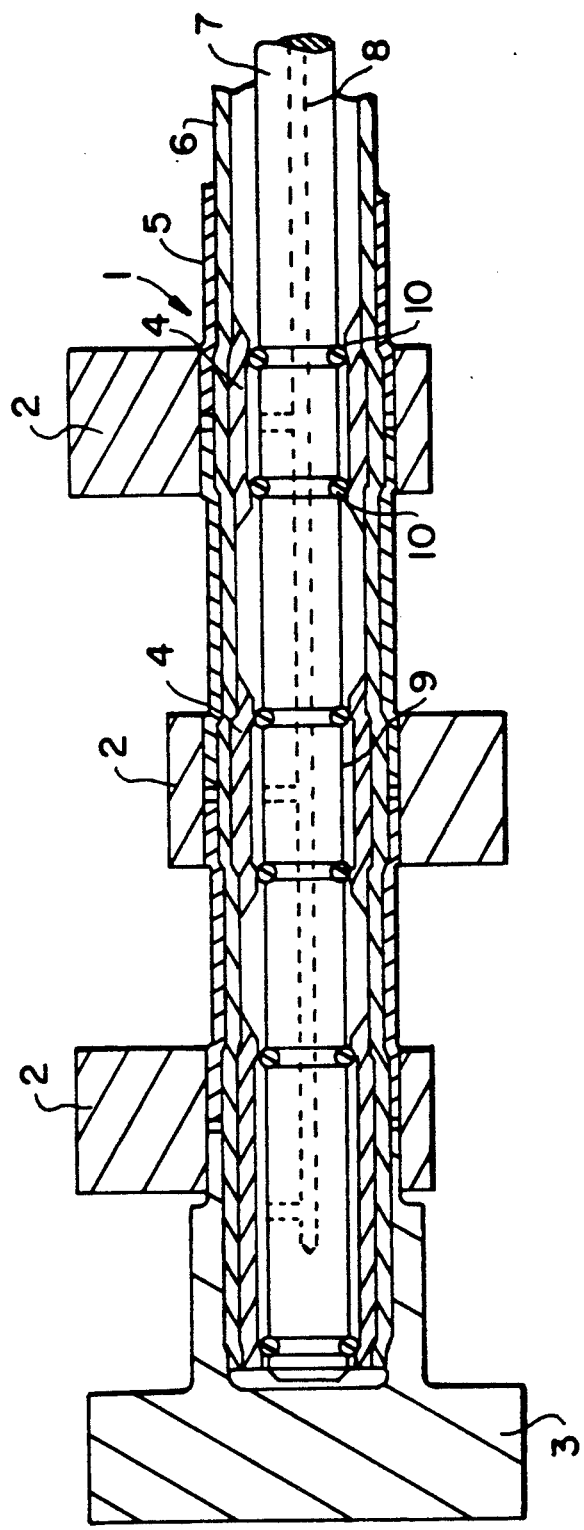
FIG. 2 shows an expanded camshaft pursuant to FIG. 1.
Figure 3:
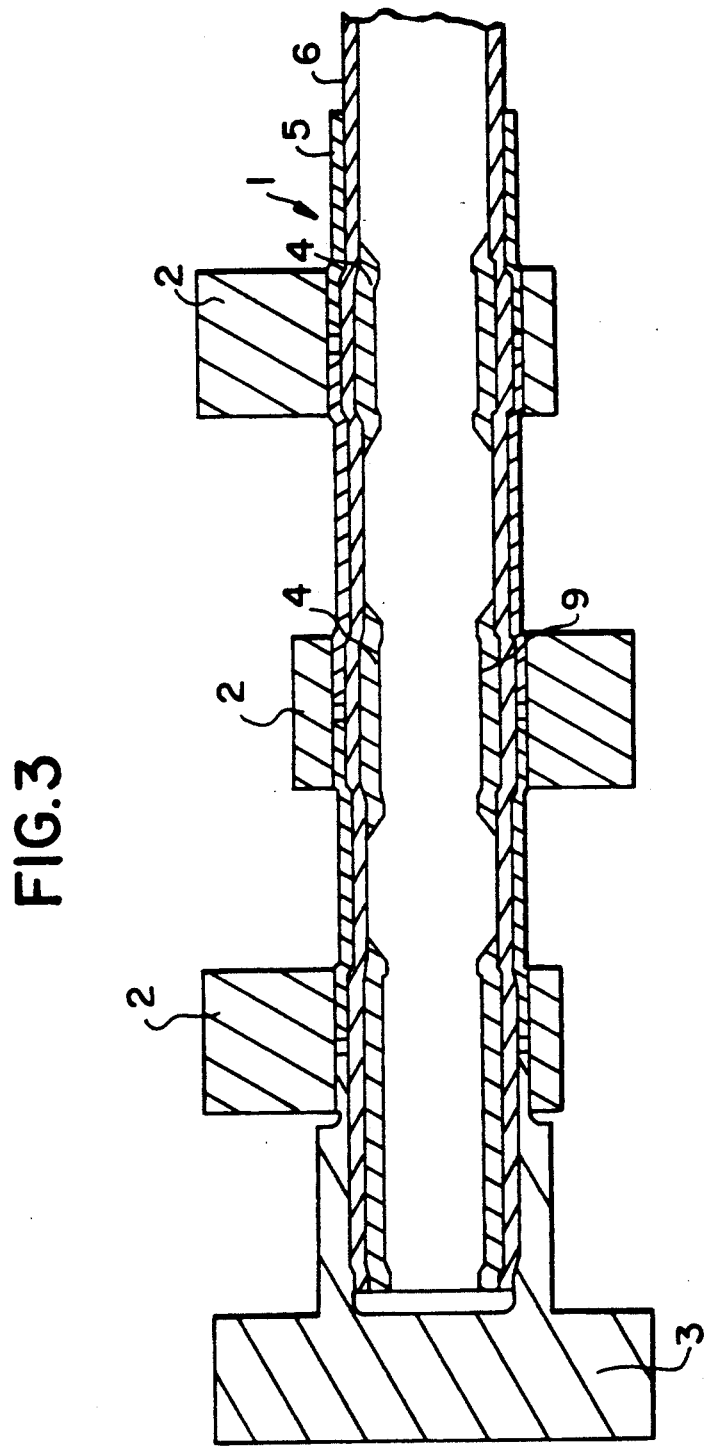
FIG. 3 shows the expanded camshaft of FIG. 2, with the probe removed.

FIG. 2 illustrates, in a greatly exaggerated manner, the expansion of the shaft 1 and the sleeves 4 in the areas P1, P2 and P3, shown in FIG. 1. FIG. 3 shows the completed cam shaft with the pressure probe 7 removed.

While the invention has been illustrated and described as embodied in an assembled hollow shaft and method for producing the shaft, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. An assembled shaft, comprising:
    a hollow shaft of a material having a modulus of elasticity;
    elements with through-bores attached to the shaft by expansion of the shaft in individual associated longitudinal portions; and
    supporting sleeves provided inside individual hollow shaft portions inside individual of the elements, respectively, so as to rest against the hollow shaft and be plastically expanded in situ thereby expanding the shaft, at least the individual elements of both the elements and the hollow shaft having an elastic pretension in the through-bore thereof, the supporting sleeves being of a material having a modulus of elasticity higher than the modulus of elasticity of the hollow shaft material, the hollow shaft being comprised of two layers over its complete length, the two layers including an outer layer made of a high-tensile bearing material.

* * * * *